(12) United States Patent
Moon et al.

(10) Patent No.: US 12,134,469 B2
(45) Date of Patent: Nov. 5, 2024

(54) VERTICAL TAKE-OFF AND LANDING AIRCRAFT USING HYBRID-ELECTRIC PROPULSION SYSTEM AND THE CONTROL METHOD

(71) Applicant: CHANGINAVIATION CO., LTD, Incheon (KR)

(72) Inventors: Chang Mo Moon, Seoul (KR); Ji Ho Moon, Seoul (KR)

(73) Assignee: CHANGINAVIATION CO., LTD, Incheon (KR)

( * ) Notice: Subject to any disclaimer, the term of this patent is extended or adjusted under 35 U.S.C. 154(b) by 369 days.

(21) Appl. No.: 17/284,776

(22) PCT Filed: Oct. 29, 2019

(86) PCT No.: PCT/KR2019/014336
§ 371 (c)(1),
(2) Date: Apr. 12, 2021

(87) PCT Pub. No.: WO2020/096254
PCT Pub. Date: May 14, 2020

(65) Prior Publication Data
US 2021/0387723 A1    Dec. 16, 2021

(30) Foreign Application Priority Data

Nov. 7, 2018   (KR) .................. 10-2018-0136057
Jul. 12, 2019  (KR) .................. 10-2019-0084226

(51) Int. Cl.
*B64C 29/00*   (2006.01)
*B64D 27/02*   (2006.01)
(Continued)

(52) U.S. Cl.
CPC .......... *B64C 29/0025* (2013.01); *B64D 27/24* (2013.01); *B64D 31/06* (2013.01); *B64D 27/026* (2024.01)

(58) Field of Classification Search
None
See application file for complete search history.

(56) References Cited

U.S. PATENT DOCUMENTS

| 11,485,488 B1* | 11/2022 | Armer .................. B64C 17/00 |
| 2013/0134264 A1 | 5/2013 | Carter et al. |

(Continued)

FOREIGN PATENT DOCUMENTS

| CN | 105015786 A * | 11/2015 | ............... H02P 9/02 |
| KR | 10-2011-0112402 A | 10/2011 | |

(Continued)

OTHER PUBLICATIONS

KR-1667330-B1 (Beck S) Oct. 2016 (merged translation and original) [retrieved on Apr. 20, 2023]. Retrieved from: Espacenet.com [Patent search database online]. (Year: 2016).*

(Continued)

*Primary Examiner* — Brady W Frazier
*Assistant Examiner* — Anna L. Gordon
(74) *Attorney, Agent, or Firm* — Revolution IP, PLLC

(57) ABSTRACT

A vertical takeoff and landing aircraft using a hybrid electric propulsion system and a control method therefor according to an embodiment of the present invention: performs control such that, during vertical takeoff and landing of an aircraft (1), a generator (20), a power management device (4), and a battery management system (60) simultaneously provide power to a motor (80); and performs control such that, during a cruise flight or transition flight of the aircraft (1), the thrust of a second propeller (82) is increased and a battery (62) of the battery management system (60) is (Continued)

charged with redundant power generated by the generator (20).

1 Claim, 10 Drawing Sheets

(51) Int. Cl.
    *B64D 27/24*     (2024.01)
    *B64D 31/06*     (2024.01)

(56) References Cited

U.S. PATENT DOCUMENTS

| | | |
|---|---|---|
| 2015/0197335 A1 | 7/2015 | Dekel et al. |
| 2016/0207625 A1* | 7/2016 | Judas ............... B64C 3/38 |
| 2017/0170764 A1* | 6/2017 | Blackwelder ....... H02J 3/40 |
| 2018/0178921 A1 | 6/2018 | Bak et al. |
| 2019/0127056 A1* | 5/2019 | Weekes ............. B64D 9/00 |
| 2019/0233107 A1* | 8/2019 | Tian ................. B64U 50/19 |
| 2020/0039639 A1* | 2/2020 | Sinusas ........... B64C 27/006 |

FOREIGN PATENT DOCUMENTS

| | | | |
|---|---|---|---|
| KR | 10-2015-0058197 A | 5/2015 | |
| KR | 10-1638964 B1 | 7/2016 | |
| KR | 10-1667330 B1 | 10/2016 | |
| KR | 101615486 B1 * | 10/2016 | |
| KR | 10-2016-0147339 A | 12/2016 | |
| KR | 10-2017-0135577 A | 12/2017 | |
| KR | 10-2018-0116849 A | 10/2018 | |
| KR | 10-1970601 B1 | 4/2019 | |
| WO | WO-2018078388 A1 * | 5/2018 | ........... B64C 21/00 |
| WO | 2020-184934 A1 | 9/2020 | |

OTHER PUBLICATIONS

International Search Report for PCT/KR2019/014336 mailed Feb. 6, 2020 from Korean Intellectual Property Office.
The extended European search report of European Patent Application No. 19883087.9 mailed Jun. 8, 2022.

* cited by examiner

【Fig. 1】
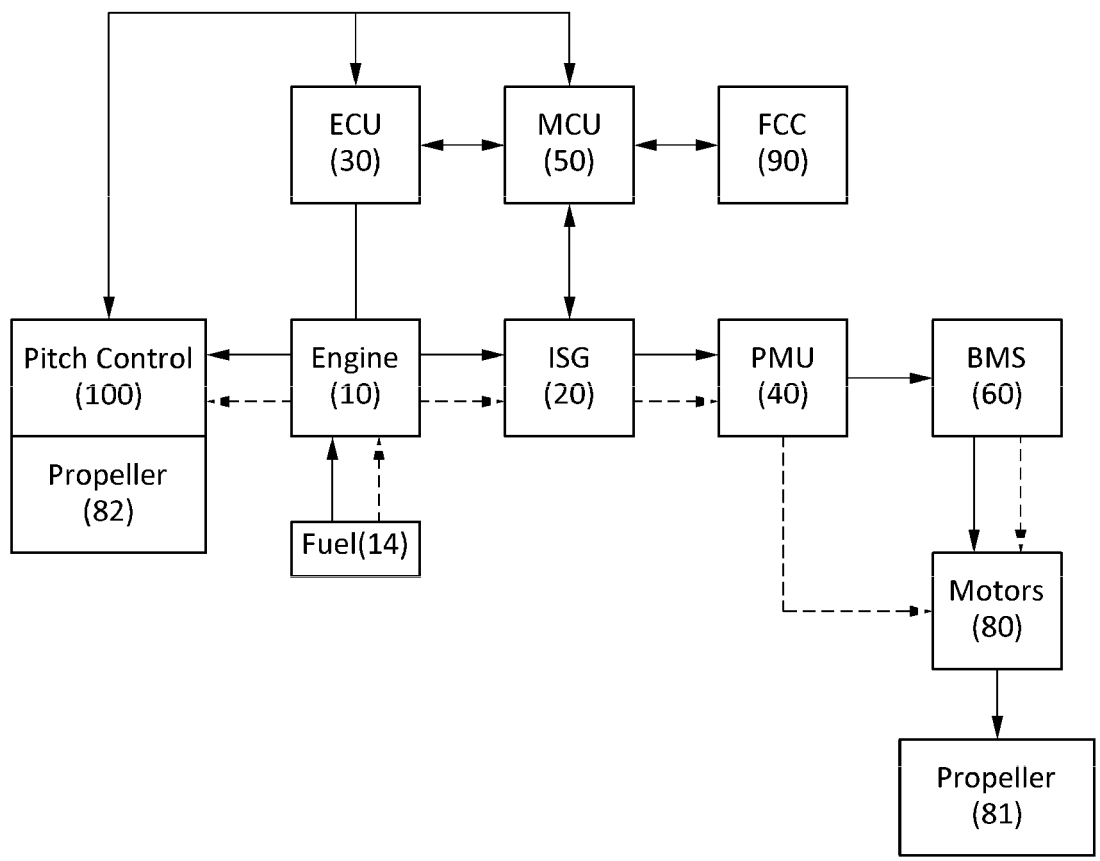

[Fig. 3]
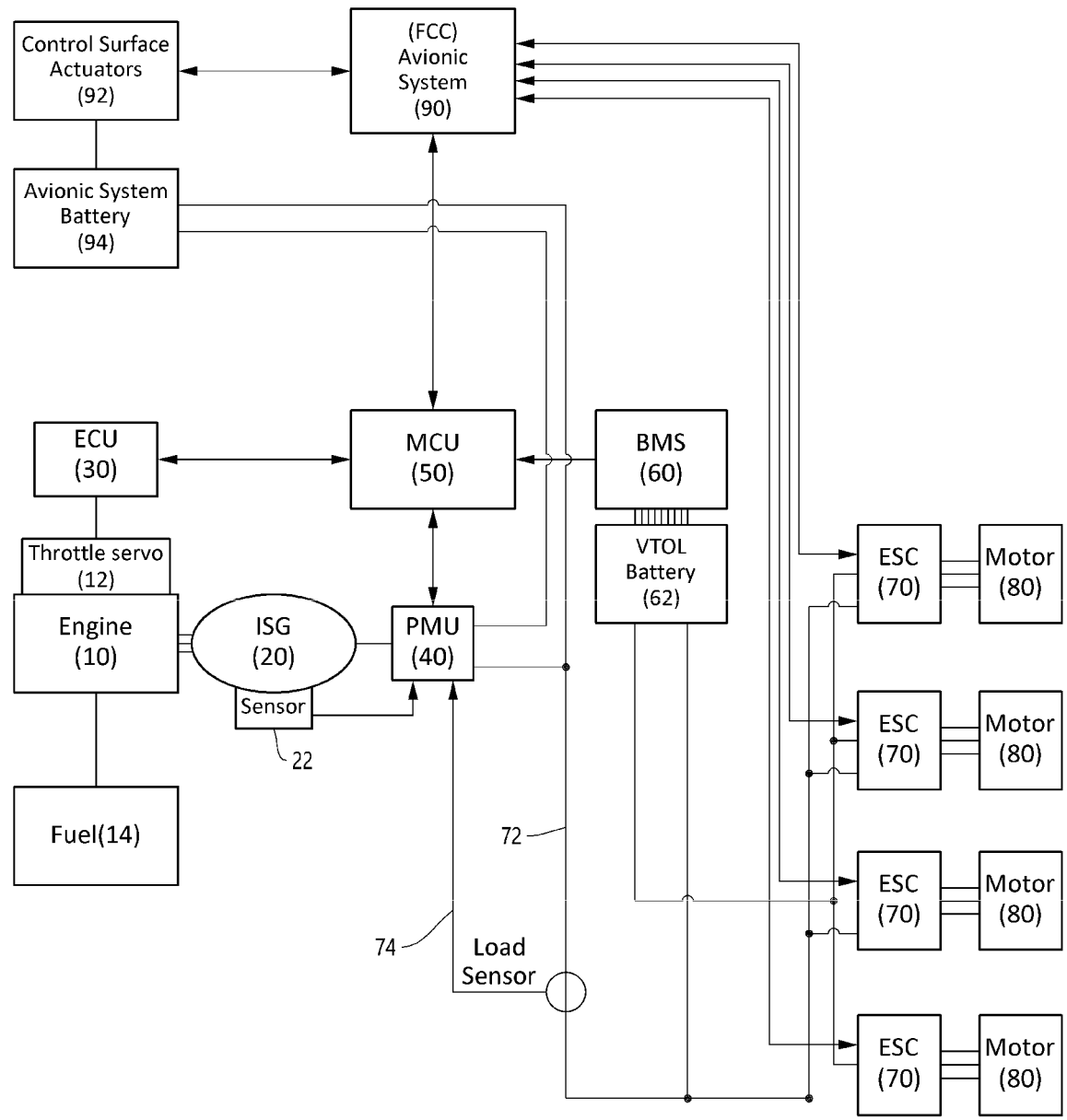

【Fig. 4】
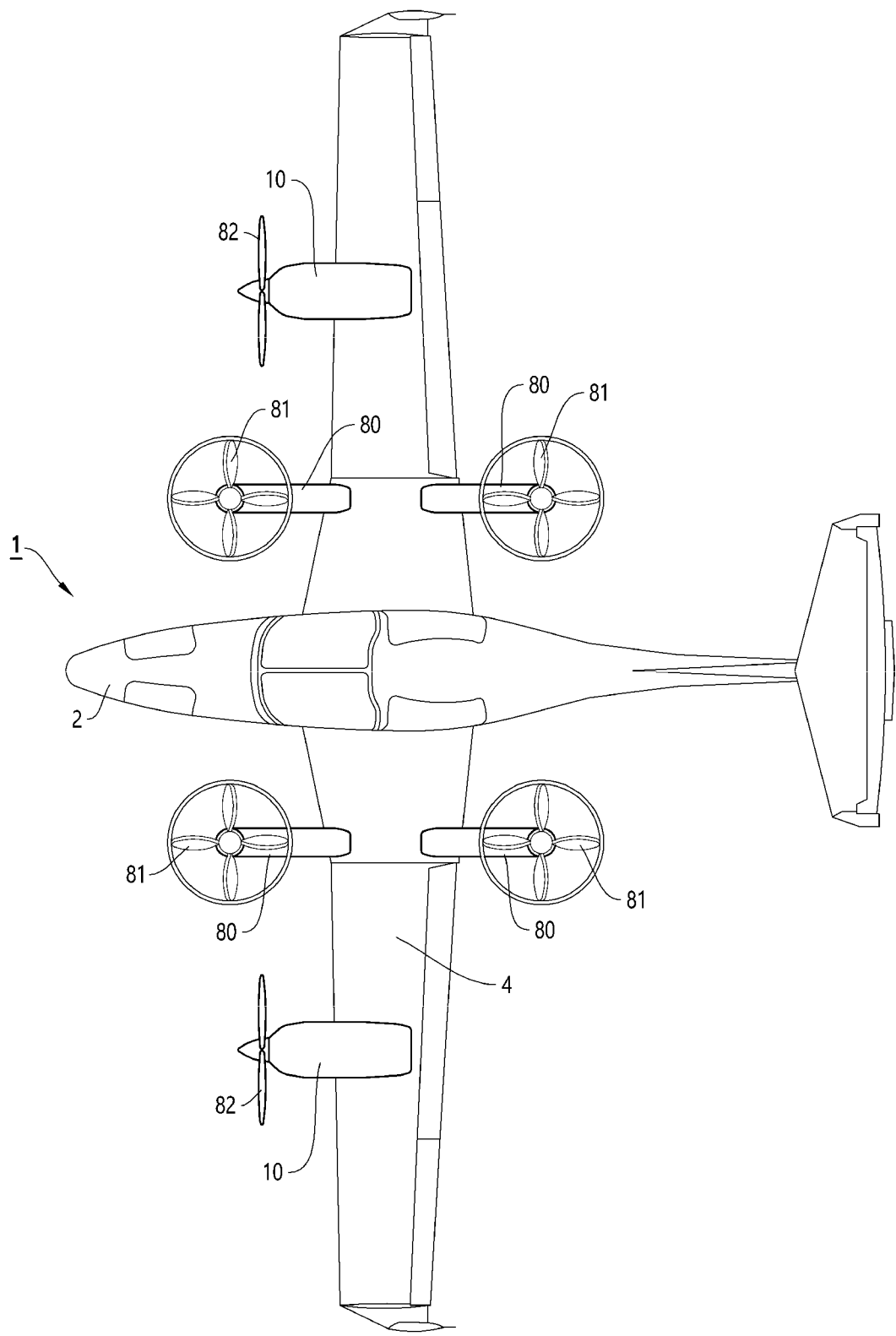

[Fig. 5]
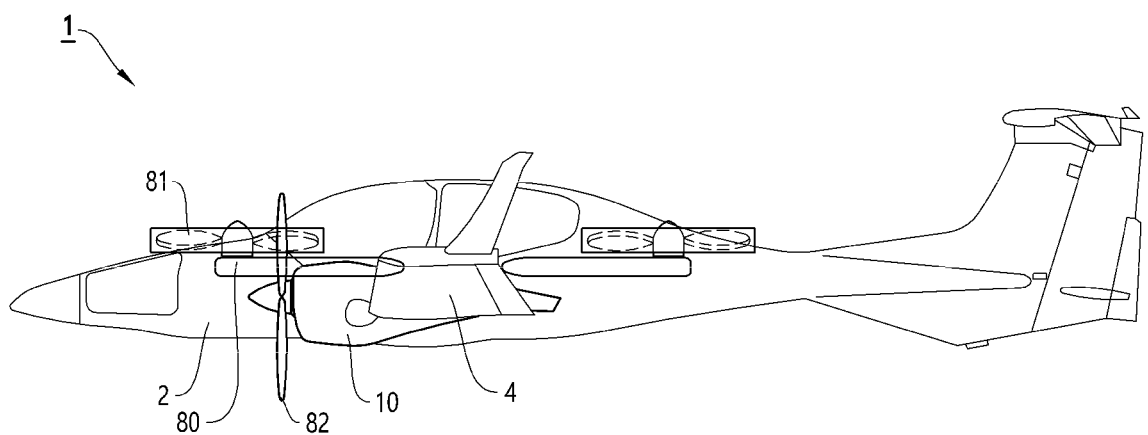

[Fig. 6]
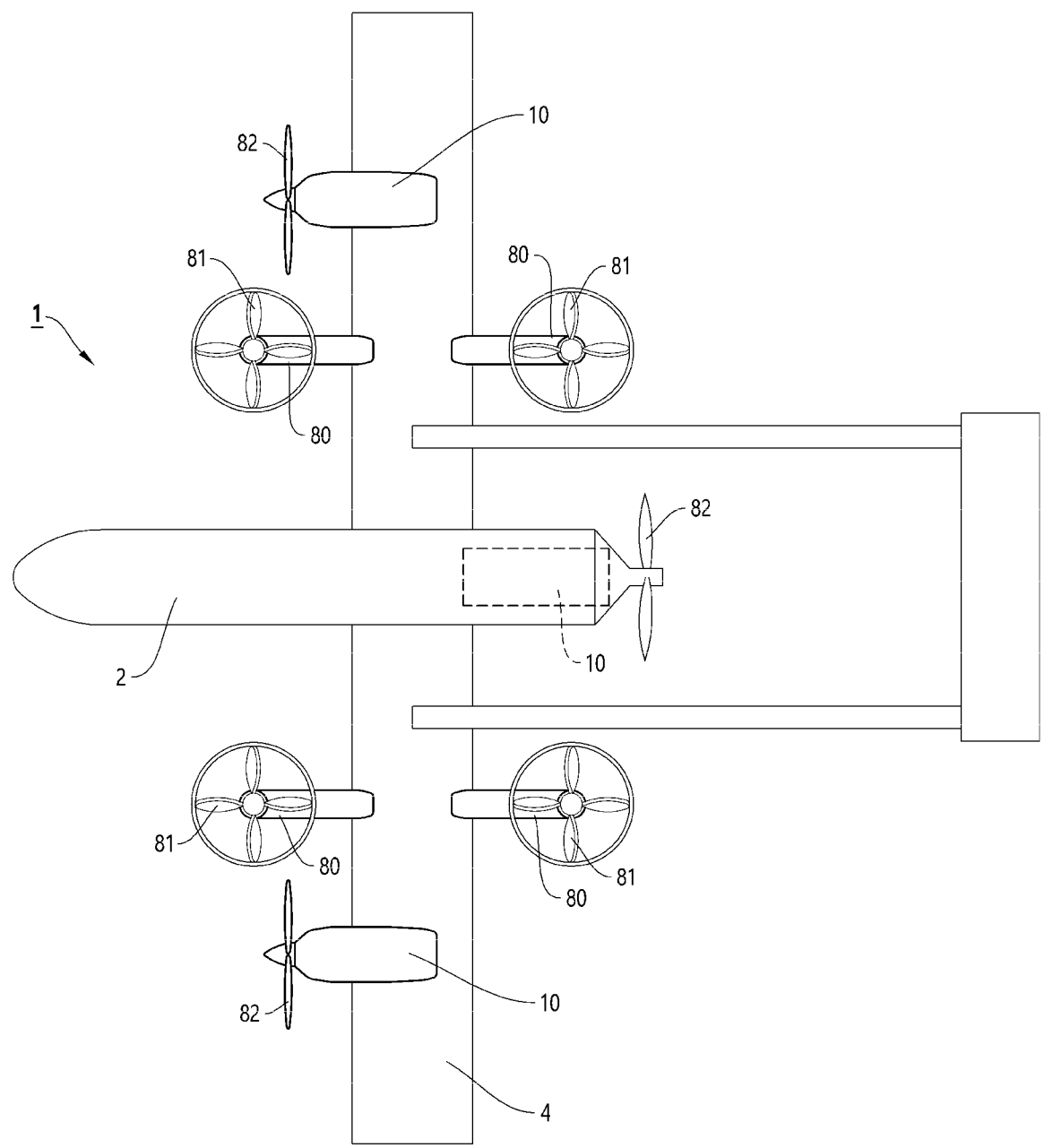

[Fig. 7]
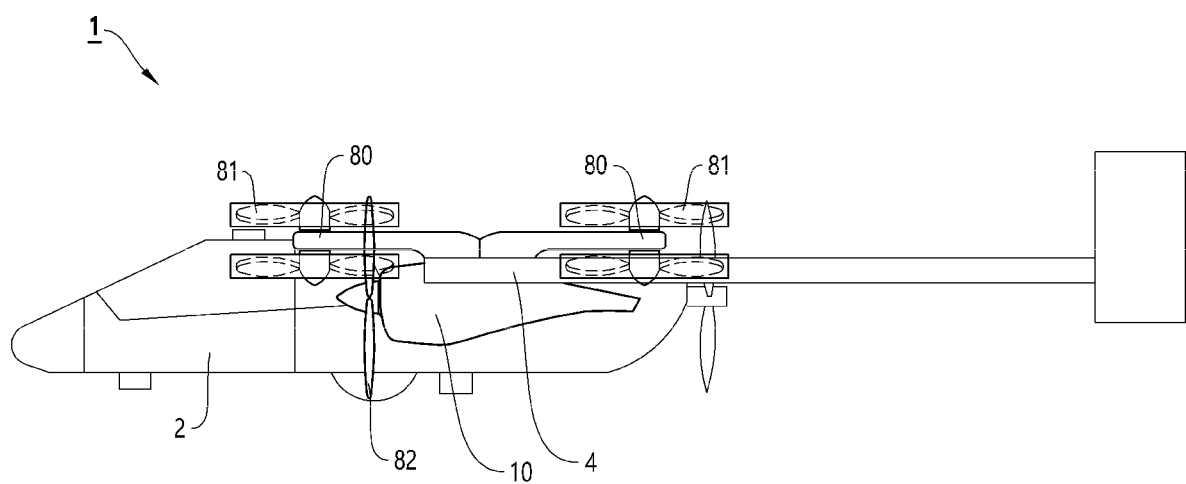

【Fig. 8】
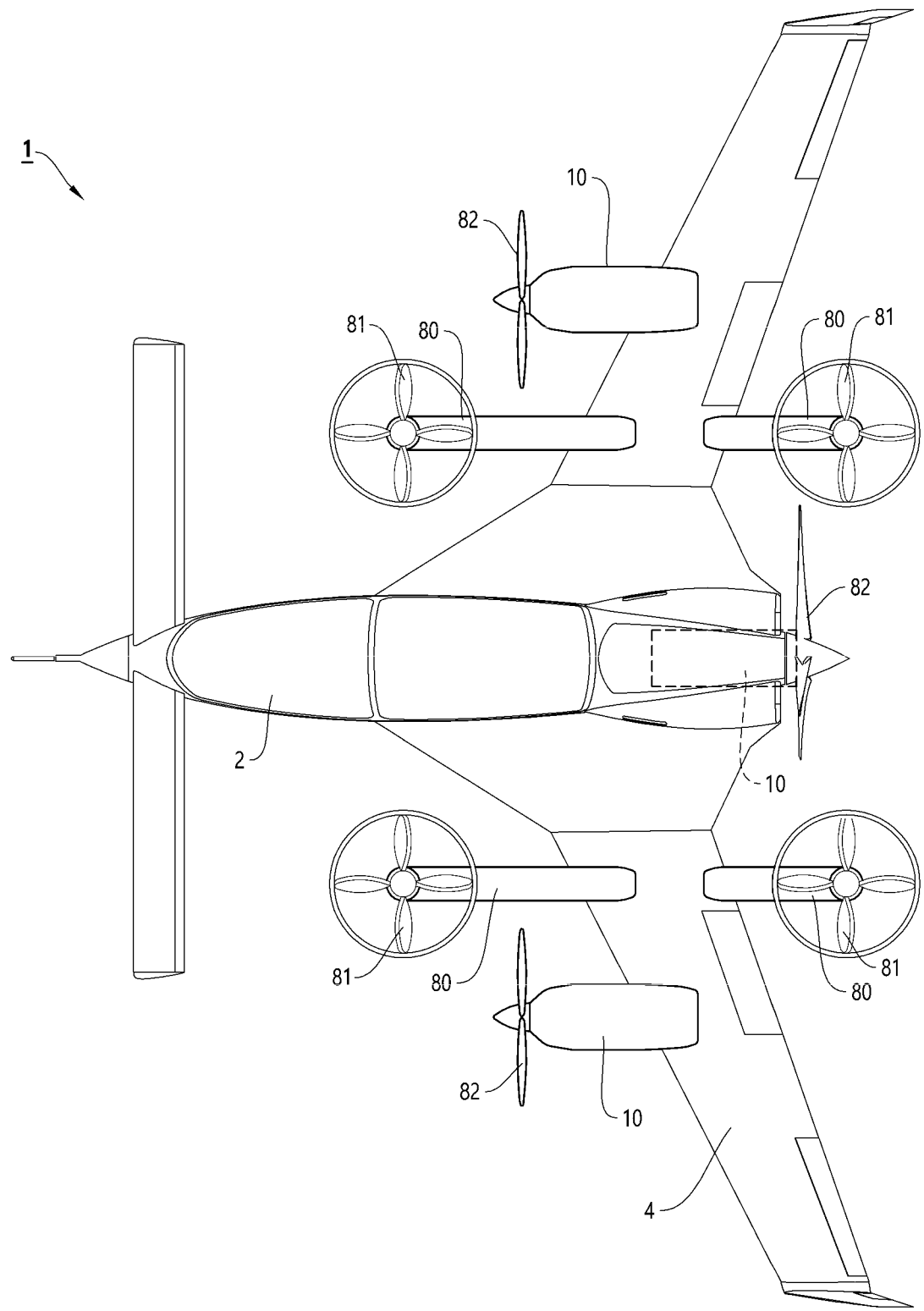

[Fig. 9]
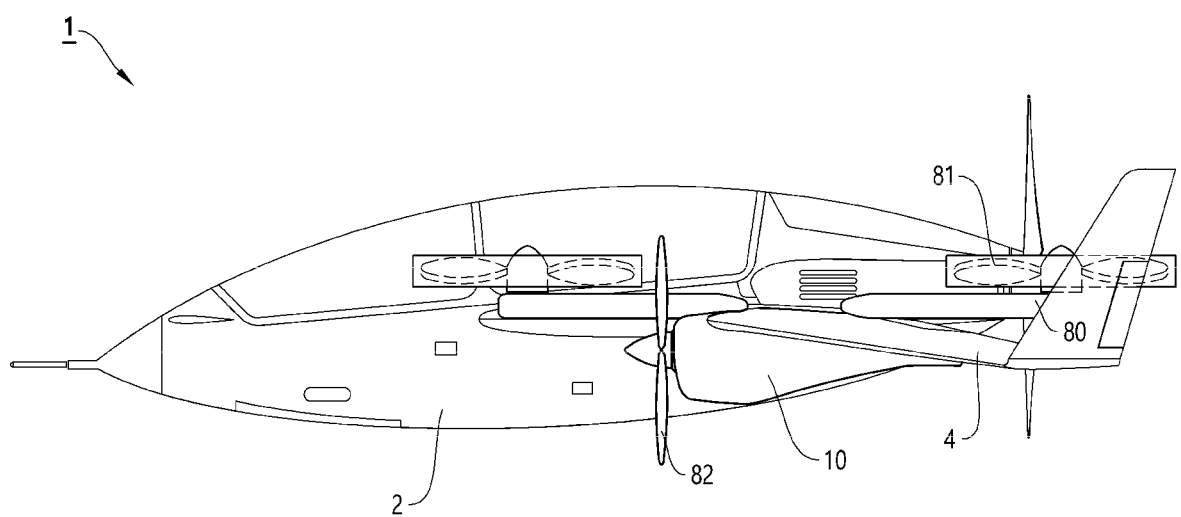

VERTICAL TAKE-OFF AND LANDING AIRCRAFT USING HYBRID-ELECTRIC PROPULSION SYSTEM AND THE CONTROL METHOD

FIELD OF THE INVENTION

The following embodiments relate to a vertical take-off and landing (VTOL) aircraft using a hybrid-electric propulsion system.

DESCRIPTION OF RELATED ART

A vertical take-off and landing aircraft based on a rotary wing, such as a helicopter, does not need separate takeoff and landing facilities and equipment, but has lower high-speed flight performance, high-altitude performance, and flight endurance performance than an equivalent fixed-wing aircraft.

Compared to a fixed-wing aircraft for which various propulsion systems-from an electric motor to a jet engine-are possible, a vertical take-off and landing (VTOL) aircraft which depends only on the shaft horsepower of an engine has a limited selection of appropriate propulsion systems as the weight of the aircraft decreases.

In particular, a reciprocating engine that is widely used in a small aircraft with a maximum take-off weight (MTOW) of about 10 Kg to about 300 Kg has a very small output-to-weight ratio of about 2. Therefore, in order to supply power needed for vertical take-off and landing, an engine needs to be very bulky, and the propulsion system is excessively heavier compared to an empty weight of the aircraft. Thus, it is difficult to obtain a payload and endurance time required for a mission.

Therefore, a propulsion system using a battery and an electric motor is widely used in a small aircraft. However, due to limitations of the current technology on batteries with low energy density, it is impossible to provide sufficient endurance time required for a mission.

A long endurance flight requires an energy source with high specific energy and a power device capable of converting the said energy where as a vertical take-off and landing requires an energy source with high specific power and a device capable of converting the said power.

However, an energy source or a power generating device with both high specific energy and high specific power doesn't exist, so in general, an energy source and a power generating device with high specific energy are installed in an aircraft.

Since vertical take-off and landing of an aircraft need much energy, and a propulsion system including a power generating device should be designed to supply sufficient power even during the vertical take-off and landing, such a configuration significantly increases the total weight of the propulsion system beyond the weight needed for a flight, causing an increase in weight of the aircraft and inefficiency of the propulsion system.

Recent and continuing efforts include utilizing an energy source with high specific energy and an energy source with high specific power at the same time to decrease the weight of the propulsion system, increase efficiency, and provide longer endurance time.

In addition, with respect to vertical take-off and landing, vertical take-off and landing is a significantly less stable flight method, as understood by the aircraft related parties. Vertical take-off and landing aircraft inevitably undergo the process of taking off in the vertical direction and transitioning to cruise flight. However, this transition process is significantly less stable and dangerous. In particular, the tiltrotor type vertical take-off and landing aircraft has an inevitable structural problem of tilting their driving source in the air in an unstable manner when the aircraft has yet to reach a stable cruise flight mode.

For example, in the case of the V-22 Osprey, a typical tiltrotor aircraft operated by the US Marines, there are many cases of crash during the transition after take-off, and there were even massive demonstrations in Okinawa, Japan, against the deployment of the Osprey due to controversy over its stability. (Refer to "Japan requests US Forces to review the deployment of Osprey in Okinawa," Kyunghyang Shinmun, dated Aug. 5, 2013, http://news.khan.co.kr/kh_news/khan_art_view.html?art_id=201308052211075, and "100,000 of public protest in Japan against 'Osprey' [Analysis] Opposition against the deployment of US-made troublemaker, a vertical take-off and landing aircraft, in Okinawa," Pressian, dated Sep. 10, 2012, http://www.pressian.com/news/article.html/no=64120#09T0) In other words, the public is also aware of the lack of flight stability of the tilting vertical take-off and landing aircraft as compared to many other fixed-wing aircrafts.

PRIOR ART DOCUMENTS

Patent Document (Patent Document 1) KR 10-2011-0112402 A
(Patent Document 2) KR 10-1667330 B1
(Patent Document 3) KR 10-1615486 B1
(Patent Document 4) KR 10-1638964 B1

DETAILED DESCRIPTION OF THE INVENTION

Technical Problem

Thus, the technical problem of this invention is to provide vertical take-off and landing aircraft and the control method using a hybrid-electric propulsion system that can efficiently utilize available energy by solving a large difference in thrust between vertical take-off and landing and cruise flight.

As implied in the above background, the invention can fundamentally exclude mechanical structures for tilting by avoiding tiltrotor method. This allows the aircraft to increase the flight range instead of reducing the weight. In addition, stable vertical take-off and landing and cruise flight can be implemented by excluding the tilting process of the driving source.

Technical Solutions

The hybrid vertical take-off and landing aircraft according to an embodiment for achieving the above technical problem may include an aircraft (1) having a fixed-wing (4) in the body (2); an engine (10) installed on the aircraft (1) and generates power by burning fuel; a generator (20) connected to the engine (10) to generate electric power; a power management unit (40) for managing the power; a battery management system (60) in which power provided from the power management unit (40) is charged; a motor (80) installed on the fixed-wing (4) and operated by receiving power from the battery management system (60); a first propeller (81) operated by the motor (80); a second propeller (82) operated by the engine (10); and a control unit (50) for controlling the operation of the engine (10), the generator (20), the motor (80), and the second propeller (82), The control unit (50) may include controlling the motor (80) to simultaneously supply power from the generator (20), the power management unit (40), and the battery management system (60) during the aircraft (1) vertical take-off and landing;

Also, the control unit (50) of the hybrid vertical take-off and landing aircraft according to an embodiment may be reduced and controlled so that the thrust of the second propeller (82) does not affect the aircraft (1) during take-off and landing.

Also, the control unit (50) of the hybrid vertical take-off and landing aircraft according to an embodiment may control the power connection to be blocked between the engine (10) and the second propeller (82) of the aircraft (1) during take-off and landing.

Also, the control unit (50) of the hybrid vertical take-off and landing aircraft according to an embodiment may be controlled to increase the thrust of the second propeller (82) when the aircraft (1) is in cruising flight or transition mode, and charge the spare power generated by the generator (20) to the battery (62) of the battery management system (60).

A control method for the hybrid vertical take-off and landing aircraft according to an embodiment may include a first step in which the power is generated; a second step in which the power is generated by operating the generator (20) with the power; a third step in which the power is distributed and provided to each component of the aircraft (1) by the power management unit (40); a fourth step in which a portion of the power is charged to the battery (62) of the battery management system (60); and a fifth step of operating the first propeller (81) with the motor (80).

Also, the control method may include controlling the power to be simultaneously supplied to the motor (80) from the generator (20), the power management unit (40), and the battery (62) during the aircraft (1) vertical climb or descent.

Also, the control method for the hybrid vertical take-off and landing aircraft according to an embodiment may include reducing and controlling the thrust of the second propeller (82) for cruising flight does not affect the flight of the aircraft (1) by any chance during the aircraft (1) vertical climb and descent. Specifically, the angle of attack of the second propeller (82) may be adjusted from 0 to 90 degrees or to have a negative value.

Also, the control method for the hybrid vertical take-off and landing aircraft according to an embodiment may include controlling the power connection to be blocked between the engine (10) and the second propeller (82) of the aircraft (1) during vertical take-off and landing.

Also, the control method for the hybrid vertical take-off and landing aircraft according to an embodiment may include controlling the thrust of the second propeller (82) to be increased when the aircraft (1) is in cruising flight or transition mode, and charging the spare power generated by the generator (20) to the battery (62) of the battery management system (60).

Details of other embodiments are included in the detailed description and drawings.

Effects of the Invention

The hybrid vertical take-off and landing aircraft and the control method according to an embodiment as described above may reduce a power loss even if the power generated from the engine is delivered to the second propeller during vertical take-off and landing by maintaining a feathering state, control the desired thrust by adjusting the angle of attack of the second propeller at the transition mode altitude during transition mode, and generate a necessary thrust by adjusting the angle of attack of the second propeller during cruising flight.

Also, the hybrid vertical take-off and landing aircraft and the control method according to an embodiment may, with the installation of a clutch unit when a fixed angle of attack propeller is adopted, reduce the power loss by blocking the power delivered from the engine to the second propeller during vertical take-off and landing, adjust the engine thrust by controlling the engine control unit using the clutch unit to deliver the power to the second propeller at the transition mode altitude during transition mode, deliver the power to the second propeller with the clutch unit during cruising flight and distribute and utilize an energy efficiently by aligning the first propeller for vertical take-off and landing with the traveling direction of the aircraft.

In an embodiment, the first propeller may be used during the aircraft vertical climb or descent for take-off and landing, output power from the engine, generator, and the power management unit may be used simultaneously for the operation of the first propeller to reduce a capacity of the battery, thus battery weight may be reduced, and the weight of the aircraft may be reduced in proportion to the battery reduction.

Also, the hybrid vertical take-off and landing aircraft and the control method according to an embodiment of the application invention may fundamentally exclude mechanical structures for tilting by avoiding tiltrotor method, through which the weight of the aircraft may be reduced and the flight range may be increased. In addition, stable vertical take-off and landing and cruising flight may be implemented by excluding the tilting process of the driving source. Specifically, the mechanical mechanism by which a conventional tiltrotor aircraft performs tilting is quite complex and flight control difficulties during tilting have reduced flight stability, whereas the hybrid vertical take-off and landing aircraft and the control method according to an embodiment of the application invention may increase the thrust slowly with pitch control of the propeller and perform a stable transition mode.

BRIEF DESCRIPTION OF THE DRAWINGS

FIG. 1 is a diagram for describing a pitch control propeller mounting type of a hybrid vertical take-off and landing aircraft according to an embodiment.

FIG. 3 is a schematic diagram of a hybrid vertical take-off and landing aircraft according to an embodiment.

FIG. 4 and FIG. 5 are diagrams showing an example of a hybrid vertical take-off and landing aircraft according to an embodiment.

FIG. 6 and FIG. 7 are diagrams showing other example of a hybrid vertical take-off and landing aircraft according to an embodiment.

FIG. 8 and FIG. 9 are diagrams showing another example of a hybrid vertical take-off and landing aircraft according to an embodiment.

BEST MODE FOR CARRYING OUT THE INVENTION

Figure 2A:
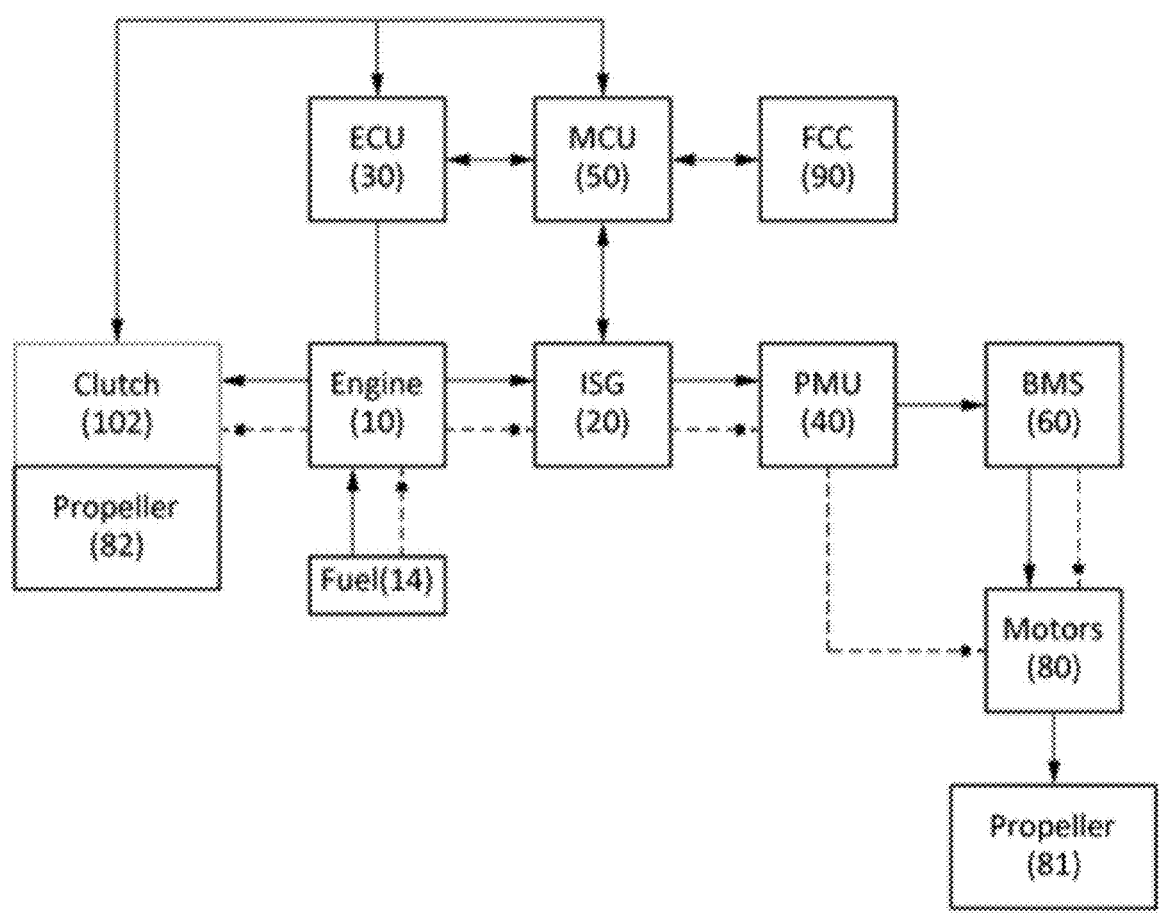
FIG. 2A is a diagram for describing a clutch unit mounting type of a hybrid vertical take-off and landing aircraft according to an embodiment.

The merits and characteristics of the invention, and a method of achieving them will become apparent with reference to the embodiments described later in detail together with the accompanying drawings.

Hereinafter, embodiments of the invention will be described in detail with reference to the accompanying drawings. The embodiments described below are illustratively shown to aid understanding of the invention, and it should be understood that the invention may be variously modified and implemented differently from the embodiments described herein. However, when it is determined that a detailed description of a related publication function or component may unnecessarily obscure the subject matter of the invention while describing the invention, the detailed description and detailed diagrams thereof will be omitted. In addition, the accompanying drawings may not be drawn to scale to aid understanding of the invention, and the sizes of some components may be overstated.

Terms such as first and second may be used to describe various components, but the components may not be limited by the terms. The terms may only be used for the purpose of distinguishing one component from other components. For example, without departing from the scope of the rights of the invention, a first component may be named as a second component, and similarly, a second component may be named as a first component.

The terms to be described later are those established in consideration of functions in the invention, which may vary according to the intention or practice of the manufacturer, the definition should be made based on the contents throughout the specification.

The same reference symbol refers to the same component throughout the specification.

Hereinafter, a hybrid vertical take-off and landing aircraft and the control method according to an embodiment is described with reference to FIGS. 1 to 5. FIG. 1 is a diagram for describing a pitch control propeller mounting type of a hybrid vertical take-off and landing aircraft according to an embodiment.

A hybrid vertical take-off and landing aircraft according to an embodiment may be configured, including an aircraft (1), an engine (10), a generator (20), a power management unit (40), a battery (60), a motor (80), a first and second propeller (81, 82) and a control unit (50).

The aircraft (1) may be a configuration having a fixed-wing (4) on a body (2) as shown in FIGS. 4 to 9.

The engine (10) may be installed on the aircraft (1), more specifically on the fixed-wing (4) and may generate power by burning fuel.

The generator (20, ISG: Integrated starter generator) may be connected to the engine (10) and may generate power by operating with engine output.

The generator (20) may also function as a starter, and thus, which in turn provides power to the generator (20) to start the engine (10).

The power management unit (40, PMU: Power Management Unit) may manage the power, in more detail, may manage generated power, dump power, and battery charging power.

The battery management system (60) may be configured including a primary battery (62) and the power supplied from the power management unit (40) may be charged to the primary battery (62).

The motor (80) may be installed on the fixed-wing (4) or the body (2), and may be operated by receiving power from the battery management system (60).

The first propeller (81) may be operated by the motor (80). The first propeller (81) may be installed in a vertical direction and may be installed to tilt to an appropriate slope, depending on the flight purpose of the aircraft (1).

The second propeller (82) may be operated by the engine (10).

As shown in FIG. 1, the second propeller (82) may be equipped with a pitch control unit (100), and the angle of attack of the second propeller (82) may be adjusted with pitch control unit (100).

Figure 2B:
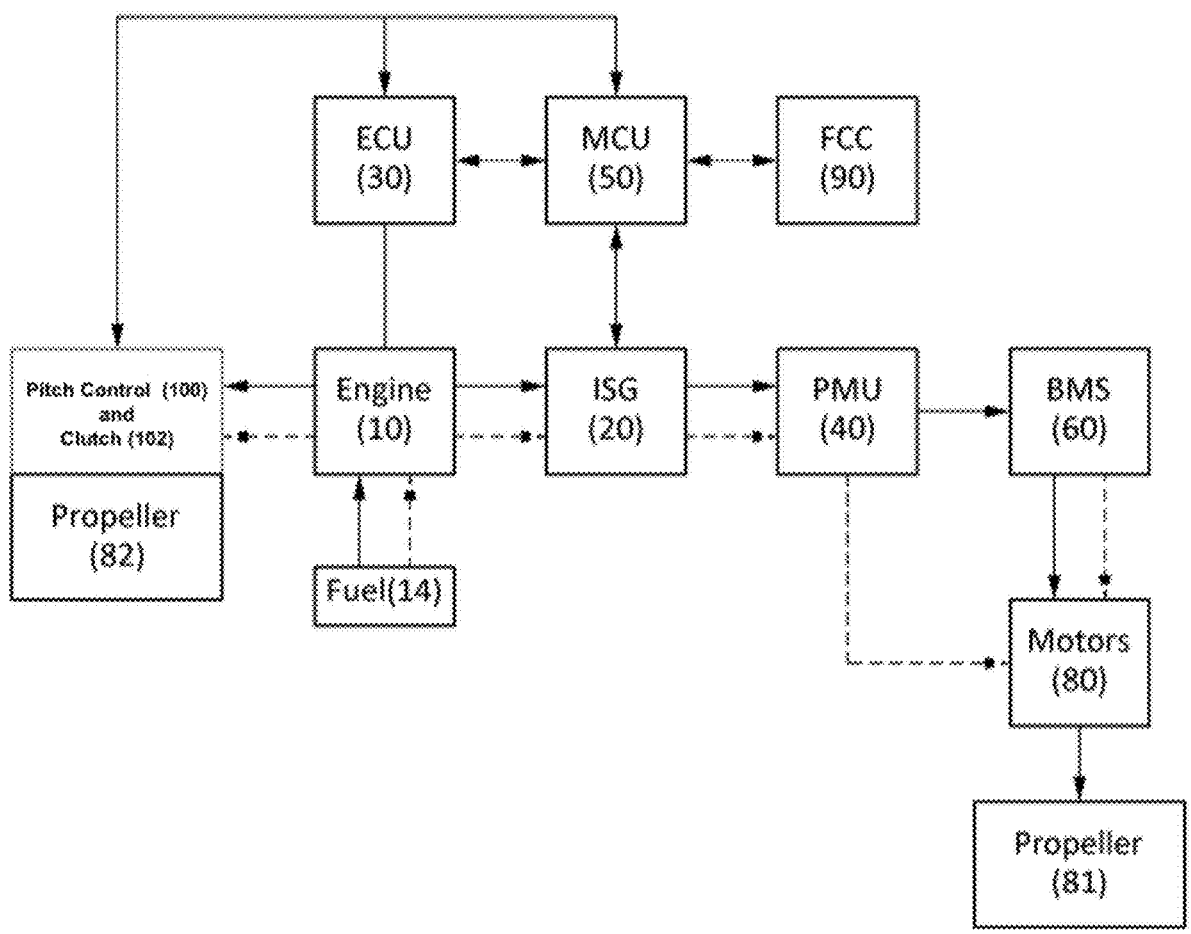
FIG. 2B is a diagram for describing both a clutch unit (102) and a pitch control unit (100) equipped in the hybrid vertical take-off and landing aircraft.

As shown in FIG. 2, a clutch unit (102) may be equipped between the engine (10) and the second propeller (82), and the clutch unit (102) may disconnect or connect power from the engine (10) to the second propeller (82).

The control unit (50) may control the operation of the engine (10), the generator (20), the motor (80), and the second propeller (82).

The control unit (50) may be implemented by an engine control unit (30), the power management unit (40), a master control unit, an aviation control system (90), and a flight control computer (FCC).

The engine control unit (30) may control the number of revolutions of the engine (10) and, more specifically, may control the output of the engine (10) by opening and closing the throttle servo (12).

The master control unit may collectively control the aircraft (1), and the aviation control system (90) and the flight control unit may control the operation of the aircraft (1), for example, It may be used to control speed, pressure, communication, and attitude of the aircraft.

The control unit (50) may control the motor (80) to simultaneously supply power from the above generator (20) and the power management unit (40) and the battery management system (60) to the motor (80) during the aircraft (1) vertical take-off and landing.

The hybrid vertical take-off and landing aircraft according to an embodiment of the invention configured as described above may use the first propeller (81) during the aircraft (1) vertical climb or descent for take-off and landing, and reduce battery capacity by simultaneously using power output from the engine (10), generator (20), and the power management unit (40) to operate the first propeller (81).

Accordingly, the hybrid vertical take-off and landing aircraft according to an embodiment may reduce the weight of the battery and reduce the weight of the aircraft in proportion to the battery reduction.

DESCRIPTION OF SYMBOL

1: Aircraft
2: Body
4: Fixed-wing
10: Engine
12: Throttle Servo
14: Fuel System
20: Generator
22: Sensor
30: Engine Control Unit
40: Power Management Unit
50: Master Control Unit
60: Battery Management System
62, 94: First and Second Battery
70: Electronic Speed Control Unit
72: Power Line 74: Load Detection Line
80: Motor 81,
82: First and Second Propeller
90: Aviation Control System
92: Control Actuator
94: Second Battery 100: Pitch Control Unit
102: Clutch Unit

MODE(S) FOR CARRYING OUT THE INVENTION

Hereinafter, an example of electronic control of a control unit (50) will be described with reference to FIG. 1.

A hybrid vertical take-off and landing aircraft according to an embodiment uses a first propeller (81) during vertical take-off and landing. First, an engine (10) receives fuel from a fuel system (14) according to the control of an engine control device (30) and outputs power.

A generator (20) may be controlled by a control unit (50), and may be operated by the power to produce electricity.

The power generated by the generator (20) may be managed by a power management unit (40), for example, it may be distributed to those that require power, monitored whether the power is overproduced, and may be controlled to reduce engine (10) output through the engine control unit (30) when the power is overproduced.

The power management unit (40) may provide power to a battery management system (60), the battery management system (60) may charge some power to a first battery (62) and some other power to the motor (80).

The hybrid vertical take-off and landing aircraft according to an embodiment may be equipped with multiple number of motor (80) and an electronic speed control unit (70) per motor (80).

Each of the electronic speed control unit (70) may receive power from the battery management system (60), and each of the electronic speed control devices (70) may individually control the speed of each motor (80) under the command of the control unit (50) or an aviation control system (90), and stabilize the attitude of the aircraft (1).

A pitch control unit (100) may adjust the angle of attack of a second propeller (82) even if the second propeller (82) is operated by connected to the engine (10) and maintain the blade of the second propeller parallel to the traveling direction of the aircraft. In other words, the angle of attack is brought close to 90 degrees, thereby reducing power loss generated by the engine (10) even when the second propeller (82) is operated.

Also, the pitch control unit (100) may adjust the angle of attack of a second propeller (82) even if the second propeller (82) is operated by connected to the engine (10) and maintain the blade of the second propeller vertical to the traveling direction of the aircraft. In other words, the angle of attack is brought close to 0 degrees, thereby reducing power loss generated by the engine (10) even when the second propeller (82) is operated.

By controlling the pitch control unit (100), the control unit (50) may be controlled to reduce the thrust of the second propeller (82) does not affect the flight of the aircraft (1) by any chance during vertical take-off and landing. More specifically, the angle of attack of the second propeller (82) may be controlled to be close to 0 degrees, whereby the thrust by the second propeller (82) becomes "0", which may not affect the flight of the aircraft (1). Thereafter, by adjusting the angle of attack of the second propeller (82) to have a positive value, gradual thrust may be obtained. Since the angle of attack of the second propeller (82) is close to "0", even if the second propeller rotates with the maximum power of the engine, no thrust is generated, and the maximum power generated by the engine may be used for power generation. In addition, with regard to flight stability and obtaining gradual thrust, adjusting the angle of attack of the second propeller (82) to a positive value near 0 degrees may be preferable to reducing the value near 90 degrees.

The hybrid vertical take-off and landing aircraft according to an embodiment may use the second propeller (82) when performing a transition mode or a cruising flight.

The hybrid vertical take-off and landing aircraft according to an embodiment may adjust the desired thrust by adjusting the angle of attack of the second propeller (82) at the transition mode altitude during transition mode.

Similarly, the hybrid vertical take-off and landing aircraft according to an embodiment may generate the necessary thrust by adjusting the angle of attack of the second propeller (82) during cruising flight.

More specifically, the hybrid vertical take-off and landing aircraft according to an embodiment during transition mode between vertical take-off and landing or cruising flight may gain thrust gradually by adjusting the angle of attack of the second propeller (82) slowly from 80 to 90 degrees or near 0 degrees angle to around 25 degrees. This allows the aircraft according to the invention to slowly and safely enter the cruising flight from the transition mode, and may dramatically reduce the problem of traditional tiltrotor aircraft having poor flight stability during transition mode. Furthermore, when adjusting the thrust with the pitch control as described above and controlling the power connection between the engine and the second propeller with the clutch, it is possible to avoid wear of the clutch, which may occur when the clutch is excessively used to adjust the rotational speed of the second propeller.

Furthermore, in an embodiment, the aircraft may gain a thrust reversal by adjusting the angle of attack of the second propeller (82) to have a negative value. The aircraft thereby may take-off and land against the tail wind blowing forward from the rear of the aircraft during vertical take-off and landing in a stable manner.

Also, in an embodiment, the aircraft may control the pitch for each of the multiple of second propellers (82), thereby the pitch value of the second propeller may be adjusted differently in the vertical take-off and hovering state, allowing loitering in the air and changing the traveling direction.

In this way, the hybrid vertical take-off and landing aircraft may actively adjust the angle of attack of each second propeller (82) to have a negative or positive value at 0 degrees, thereby achieving a stable take-off and landing and increasing flight stability during the vertical take-off to transition climb stage and from the descent transition to vertical landing stage. This will prevent the induction motion sickness of passengers inside the aircraft in vertical take-off and landing. This prevents motion sickness and so on among passengers inside the aircraft. The above effects are examples, and it is evident that the effects of this invention are not limited thereto.

Furthermore, a wind direction or wind volume sensor (not illustrated) may be fixed at a prescribed position of the fixed-wing (4) of the vertical take-off and landing aircraft. Preferably, the wind direction or wind volume sensor may be fixed at the end of the fixed-wing (4) to provide sensing of the degree of wind blowing from which side relative to the aircraft, and the angle of attack of each second propeller (82) may be actively adjusted to provide stable vertical take-off and landing.

Assuming a drag ratio of 10 when the aircraft (1) is in flight, the thrust required for cruising may be one-tenth the level of a vertical climb or vertical descent, and approximately one-fifth the level of acceleration or dash flight.

In other words, a lot of energy is required during the aircraft (1) vertical climb or descent, but energy consumption may be relatively low when the aircraft (1) is in transition mode or cruising flight, resulting in dump energy. The dump energy may be electric energy, and such dump power may be charged to the first battery (62).

The control unit (50) may increase the thrust of the second propeller (82) when the aircraft (1) is in a cruising flight or transition mode, and the dump power generated by the generator (20) may be controlled to be charged in the first battery (62) of the battery management system (60). The charging of the first battery (62) may further increase the flight time of the aircraft (1).

The aircraft in an embodiment may use both the first propeller (81) and the second propeller (82) during the transition mode, and the ratio of the electric energy supplied to the first propeller (81) and the mechanical energy supplied to the second propeller (82) according to the flight type may be controlled by the control unit (50).

Also, the aircraft in an embodiment may be equipped with a clutch unit when a fixed angle of attack propeller is adopted, which will be described with reference to FIG. 2. FIG. 2 is a diagram for describing a clutch unit mounting type of a hybrid vertical take-off and landing aircraft according to an embodiment.

The control unit (50) may control to disconnect the power connection between the engine (10) and the second propeller (82) of the aircraft (1) during the vertical take-off and landing.

In an embodiment, the clutch unit (102) may be operated during the aircraft (1) vertical take-off and landing, may block the power from the engine (10) to the second propeller (82), thereby reducing power loss. The control unit (50) may control the operation of the clutch unit (102).

Also, all of the mechanical energy generated by the engine (10) may be supplied to the generator (20) to increase the electricity generation, which may enable a large capacity and stable power supply to the motor (80). Furthermore, since the first propeller (81) is operated in a good manner with the stable operation of the motor (80), vertical climb or vertical descent of the aircraft (1) may be implemented more smoothly.

Each motor (80) may be equipped with the electronic speed control unit (70).

Each of the electronic speed control units (70) may receive power from the battery management system (60), and each of the electronic speed control units (70) may individually control the speed of each motor (80) under the command of the control unit (50) or the aviation control system (90), and stabilize the attitude of the aircraft (1).

During the transition mode, the clutch unit (102) may be operated at the transition mode altitude to connect the engine (10) and the second propeller (82) to allow the second propeller (82) to increase the thrust. The engine (10) may control the engine control unit (30) to adjust the engine output, and may deliver the power of the engine (10) to the second propeller (82) with the clutch unit (102) during cruising flight.

In an embodiment, the first propeller (81) may be tilted to coincide with the traveling direction of the aircraft during cruising flight, thereby efficiently distributing and using energy.

FIG. 3 is a schematic diagram of a hybrid vertical take-off and landing aircraft according to an embodiment. Descriptions that are redundant with the technical description will be omitted.

The engine (10) may be equipped with the pitch control unit (100) or clutch unit (102).

The pitch control unit (100) may adjust the angle of attack of the second propeller (82), and the clutch unit (102) may disconnect or connect the power delivered from the engine (10) to the second propeller (82). Both clutch unit (102) and pitch control unit (100) may be equipped together as shown in FIG. 2-1.

The generator (20) may be further equipped with a sensor (22), and the sensor (22) may be connected to the power management unit (40). The sensor (22) may monitor the generator (20), and the control unit (50) may determine whether the current power generation is appropriate based on the first detection value.

The control unit (50) may control the opening of the throttle servo (12) through the engine control unit (30) in the event of insufficient power production, thereby increasing the number of engine rotations.

Conversely, when the power is overproduced, the control unit (50) may control the throttle servo (12) to close through the engine control device (30), thereby reducing the number of engine rotations.

In the hybrid vertical take-off and landing aircraft according to an embodiment, several motors (80) may be installed, and then electronic speed control unit (70) may be equipped for each motor (80). Each electronic speed control unit (70) may individually control the speed of each motor (80) according to the command of the control unit (50), thereby stabilizing the attitude of the aircraft (1).

Also, the first battery (62) of the battery management system (60) may supply power to each electronic speed control unit (70). On the other hand, each electronic speed control unit (70) may receive power by being connected to the second battery (94) through a power line (72).

The second battery (94) may provide power to drive the control actuator (92). The control actuator (92) may be driven by receiving a command from the aviation control system (90). The control actuator (92) can operate various apparatus required for flight of the aircraft (1), for example, can operate a rotary wing or a tail wing. The second battery (94) may be charged with electricity from the power management unit (40).

A load of the power line (72) may vary depending on the power consumption of each electronic speed control unit (70). A load detection line (74) may be connected to the power line (72), and the load detection line (74) may detect a load value formed on the power line (72) as a second detection value, and may be provided to the power management unit (40) or the control unit (50).

When the second detection value increases, it may be determined that power consumption increases, and in this case, the control unit (50) may control to increase the engine output of the engine (10). On the other hand, when the second detection value decreases, it is determined that power consumption decreases, and the engine output of the engine (10) may be controlled to decrease.

In an embodiment, the aircraft may detect the power consumed to operate the first propeller (81) in real time and control the engine output of the engine (10) to generate optimum power.

Hereinafter, various embodiments of the hybrid vertical take-off and landing aircraft according to an embodiment will be described with reference to FIGS. 4 to 9.

FIG. 4 and FIG. 5 are diagrams showing an example of a hybrid vertical take-off and landing aircraft according to an embodiment. FIG. 4 is a plan view of the aircraft (1), and FIG. 5 is a side view of the aircraft (1).

As shown in FIG. 4 and FIG. 5, fixed-wings (4) may be provided on both front sides of the body (2), motors (80) may be installed approximately perpendicular to the front and rear of the body (2), each motor (80) may be installed with the first propeller (81), the engine (10) can be installed horizontally on both fixed-wings (4), and each engine (10) may be installed with the second propeller (82).

FIG. 6 and FIG. 7 are diagrams showing other example of a hybrid vertical take-off and landing aircraft according to an embodiment. FIG. 6 is a plan view of the aircraft (1), and FIG. 7 is a side view of the aircraft (1).

As shown in FIG. 6 and FIG. 7, fixed-wings (4) may be provided on both sides of the body (2), motors (80) may be installed approximately perpendicular to the front and rear of the body (2), each motor (80) may be installed with the first propeller (81), the engine (10) can be installed horizontally on both fixed-wings (4), and each engine (10) may be installed with the second propeller (82). In addition, the engine (10) and the second propeller (82) may be further installed at the rear of the aircraft (1).

FIG. 8 and FIG. 9 are diagrams showing another example of a hybrid vertical take-off and landing aircraft according to an embodiment. FIG. 8 is a plan view of the aircraft (1), and FIG. 9 is a side view of the aircraft (1).

As shown in FIG. 8 and FIG. 9, fixed-wings (4) may be provided on both rear sides of the body (2), motors (80) may be installed approximately perpendicular to the front and rear of the body (2), each motor (80) may be installed with the first propeller (81), the engine (10) can be installed horizontally on both fixed-wings (4), and each engine (10) may be installed with the second propeller (82).

The hybrid vertical take-off and landing aircraft according to an embodiment may be applicable even if the structure of the aircraft (1) varies, as described with reference to FIGS. 4 to 9.

Although the embodiments of the invention have been described with reference to the accompanying drawings, those skilled in the art to which the invention pertains will understand that the invention may be implemented in other specific forms without changing the technical idea or essential features.

Therefore, the embodiments described above shall be understood as exemplary and non-limiting in all respects, and the scope of the invention shall be indicated by the claims to be described later, and the meaning, scope of the claims and all changes or modifications derived from the equivalents thereof shall be construed as being included in the scope of the invention.

INDUSTRIAL APPLICABILITY

The hybrid vertical take-off and landing aircraft and the control method according to an embodiment of the invention may be used to control flights such as vertical take-off and landing, transition mode, and cruising flight.

Accordingly, the invention may be used to provide vertical take-off and landing aircraft and the control method using a hybrid-electric propulsion system that can efficiently utilize available energy by solving a large difference in thrust between vertical take-off and landing and cruise flight.

Also, the invention can fundamentally exclude mechanical structures for tilting by avoiding tiltrotor method. This allows the aircraft to increase the flight range instead of reducing the weight. The invention may also be used to implement stable vertical take-off and landing and cruising flight by excluding the tilting process of the driving source.

The invention claimed is:

1. A vertical take-off and landing aircraft using a hybrid-electric propulsion system comprising:
a body having fixed-wings;
an engine arranged on each fixed wing and configured to generate a power by burning fuel;
a generator connected to the engine and configured to generate an electric power upon operating the engine, wherein the generator also receives the electric power supplied by a power management unit for starting the engine as a starter, the power management unit configured to manage and provide the electric power;
a battery management system having a battery, wherein the power management unit is configured to provide the electric power to the battery management system to charge the battery;
multiple motors arranged on each fixed-wing and configured to receive the electric power from the battery management system;
a first propeller arranged on each of the multiple motors and configured to be operated by each corresponding motor among the multiple motors;
a second propeller configured to be operated by the engine;
a clutch unit positioned between the engine and the second propeller and configured to disconnect or connect the power delivered from the engine to the second propeller;
a pitch control unit configured to adjust an angle of attack of the second propeller;
a sensor arranged on the generator connected to the power management unit to generate a first detection value by monitoring the generator;
a control unit configured to control an operation of the engine, the generator, the multiple motors, the second propeller, and the clutch unit,
at least one electronic speed control unit configured to control a speed of a corresponding one of the multiple motors according to a command of the control unit; and
a load detection line, which is connected to a power line connected to the at least one electronic speed control unit, detecting a load formed on the power line as a second detection value, wherein the control unit, which is connected to the load detection line, is configured to control an output of the engine based on the second detection value,
wherein the control unit is configured to control the electric power to the multiple motors from the generator, the power management unit, and the battery management system simultaneously during a vertical take-off and landing of the body, wherein the control unit is configured to control the power connected between the engine and the second propeller during the vertical take-off and landing via the clutch unit, wherein the control unit is configured to determine whether a current power generation produced by the generator is appropriate based on the first detection value,
wherein the multiple motors are configured to facilitate the first propeller to generate a first thrust in a first direction and the engine is configured to facilitate the second propeller to generate a second thrust in a second direction such that the first direction and the second direction are not identical to each other, wherein the pitch control unit is configured to adjust the angle of attack of the second propeller, while the clutch unit connects or disconnects a power transmission between the engine and the second propeller to generate a desired thrust during the vertical take-off and landing of the aircraft.

* * * * *